United States Patent [19]
Konrad et al.

[11] Patent Number: 5,467,755
[45] Date of Patent: Nov. 21, 1995

[54] METHOD AND SYSTEM FOR CONTROLLING FLEXIBLE FUEL VEHICLE FUELING

[75] Inventors: Julie A. Konrad, Saline; Mark Freeland, Farmington Hills; Brian S. Czuhai, Canton, all of Mich.

[73] Assignee: Ford Motor Company, Dearborn, Mich.

[21] Appl. No.: 295,450

[22] Filed: Aug. 25, 1994

[51] Int. Cl.⁶ ............................ F02D 41/14; F02M 37/00
[52] U.S. Cl. ........................................... 123/674; 123/575
[58] Field of Search ................................. 123/674, 675, 123/575, 1 A

[56] References Cited

U.S. PATENT DOCUMENTS

| | | | |
|---|---|---|---|
| 4,393,854 | 7/1983 | Tacquet | 123/576 |
| 4,655,188 | 4/1987 | Tomisawa et al. | 123/674 |
| 4,901,240 | 2/1990 | Schmidt et al. | 123/674 |
| 4,945,880 | 8/1990 | Gonze et al. | 123/674 |
| 5,255,661 | 10/1993 | Nankee, Ii et al. | 123/674 |
| 5,277,166 | 1/1994 | Freeland | 123/510 |

FOREIGN PATENT DOCUMENTS

| | | |
|---|---|---|
| 1005321 | 3/1957 | Germany. |
| 2259323 | 3/1982 | Germany. |
| 62-96743 | 5/1987 | Japan. |
| WO91/04406 | 4/1991 | WIPO. |

OTHER PUBLICATIONS

"Emissions, Fuel Economy, and Driveability Effets of Methanol/Butanol/Gasoline Fuel Blends", by Robert L. Furey et al., SAE Publication #821188, Oct. 1982, pp. 47–59.

"Flexible Fuel System Without Fuel Sensor", Opcon Autorotor, Nacka, Sweden, 1991, SW Patent No. 8903129–8, 4 pages.

"Development of a BMW Flexible Fuel Vehicle", by Werner Muhl et al., ATZ Automobil–technische Zeitschrift 94, 1992, pp. 80–86. English translation 18 pages.

1992 Geneva Motor Show Proceedings "Saab Ecosport", pp. 33–34.

*Primary Examiner*—Andrew M. Dolinar
*Attorney, Agent, or Firm*—Peter Abolins; Roger L. May

[57] ABSTRACT

An adaptive fuel control system and method directed for use in a motor vehicle powered by a fuel-injected engine and having a fuel tank and a fuel rail and which is operative to run on a plurality of fuels and fuel blends. The system includes a refueling mixer which acts as a fluid damper to slowly introduce new fuel into the fuel rail and correspondingly slow the rate at which new fuel composition is mixed with existing fuel. A stratification mixer is also utilized to re-mix components of blended fuels which may have separated at cold temperatures. An Exhaust Gas Oxygen sensor (EGO) monitors engine exhaust gases and generates a corresponding electrical signal when the air/fuel mixture of the fuel switches between rich and lean. Finally, an electronic control assembly communicates with the EGO and the fuel injectors to generate and store in memory an updatable extended adaptive fuel control table of air/fuel ratio multipliers for selected engine load/engine speed cells. The ECA is adapted to update each of the cells in an amount proportional to the distance the corresponding load point is away from the corresponding load point of all bordering cells. The ECA further generates and stores an updatable counter table and an updatable time stamping table which, together, are operative to adjust the fuel injectors to provide the correct adaption for the current fuel at the current engine speed and engine load.

14 Claims, 7 Drawing Sheets

METHOD AND SYSTEM FOR CONTROLLING FLEXIBLE FUEL VEHICLE FUELING

Technical Field

This invention relates generally to flexible fuel systems and, more particularly, to a system and method for maintaining proper air/fuel ratios in vehicles operable on a wide range of alcohol and gasoline fuel concentrations and blends thereof, without the need of a sensor to measure the alcohol in the fuel blend.

BACKGROUND ART

In an effort to reduce dependence on foreign oil as well as the associated economic and environmental costs of importation and distribution, many countries are now producing alcohol fuel, i.e. methanol and ethanol, from coal and domestically-grown crops, respectively. Gasoline blends of such fuels are also presently available to the consumer for automotive and related vehicle and industrial uses.

In Brazil, for example, compositions of ethanol/gasoline fuels are available in blends of 22% and 95% ethanol in gasoline, designated as E22 and E95. Ethanol and methanol blended fuels are the predominant alternative fuels used in so-called "flex" cars today, i.e. cars which run on "flexible" or alternative fuels. Ethanol and methanol blended fuels have been widely accepted because they are environmentally friendly alternatives to petroleum-based fuels since they improve exhaust emissions and are a readily renewable resource.

Vehicles calibrated to specific alcohol blended fuel compositions have been developed for production and have been found to function well provided that the intended fuel blend is used. However, as understood by those skilled in the art, if varying blends of alcohol/gasoline are provided, the vehicles do not operate at stoichiometry and thus do not provide the proper ratio of air and fuel which is required for combustion to provide maximum fuel efficiency, maximum power and minimal emissions.

In an effort to overcome this calibration problem, automotive manufacturers have typically utilized flexible fuel sensors which are discrete components operative to directly measure the alcohol concentration of fuel introduced into the engine. This information is read by the engine control computer and the correct air/fuel ratio for different fuels is adjusted on a real-time basis and maintained. While these so-called "flexible fuel systems" have been designed and implemented in North American vehicles, the systems have been found to be prohibitively expensive to implement on a wide scale commercial basis because of the significant cost of the flexible fuel sensor.

Vehicle designers have thus turned attention toward the development of "sensorless" flexible fuel systems. See, for example, the publications 1992 Geneva Motor Show Proceedings "Saab ECO Sport", pp. 33–34, and Flexible Fuel System Without Fuel Sensor, which reference Autorotor SW Patent 8903129-8. The Saab ECO Sport referenced in the Geneva Motor Show publication embodies the disclosure of the Autorotor patent. The system requires an active fuel pump and utilizes complex engine control strategy to calculate the correct fueling with the system. In operation, the additional fuel pump allows for only the stored fuel from the previous drive to be used for start-ups. Thus, additional information is provided regarding "same fuel" during the entire open-loop time period. See also, the publication "Development of a BMW Flexible Fuel Vehicle", by Werner Muhl and Heinrick Petra. This publication discloses a system which uses a fuel composition sensor and which indicates that the incorporation of an adaptive lambda control is not feasible.

Consequently, a need has developed for a "sensorless" flexible fuel system and, in particular, a flexible alcohol system which does not utilize any active additional components and will accommodate a wide range of alcohol and gasoline fuel concentrations from 0 to 100 percent alcohol (A0–A100) while still maintaining acceptable emission and performance objectives.

SUMMARY OF THE INVENTION

It is a principle object of the present invention to provide an adaptive fuel control system for use in a fuel-injected motor vehicle operative to run on varying blends of fuel which will adjust the fuel injectors to provide the correct stoichiometric air-to-fuel (A/F) ratio for the current fuel, engine speed and engine load without the need to use a feed forward signal from a flexible fuel sensor.

It is a further object of the present invention to provide such a system operative to adjust the fuel injectors of a motor vehicle which is adapted to run on gasoline/alcohol and varying gasoline/alcohol fuel blends between A0 and A100.

Still further, it is an object of the present invention to provide a method of adjusting the fuel injectors of such a fuel-injected motor vehicle operative to run on varying blends of fuel to provide the correct stoichiometric A/F for the current fuel.

Yet still further, it is an object of the present invention to provide a method as above which is operative to adjust the fuel injectors of a motor vehicle which is adapted to run on gasoline, alcohol and varying gasoline/alcohol fuel blends between A0 and A100.

In carrying out the above-stated objects and other objects, features and advantages of the present invention, there is provided an adaptive fuel control system which is directed for use in a motor vehicle powered by a fuel-injected engine and having a fuel tank and a fuel rail and which is operative to run on a plurality of fuels and fuel blends. The system includes a refueling mixer provided in fluid communication with the fuel tank which is operative as a fluid damper to slowly introduce new fuel into the fuel rail and correspondingly slow the rate at which new fuel composition is mixed with existing fuel. The system also includes a stratification mixer provided in fluid communication with the fluid rail to re-mix components of blended fuels which may have separated at cold temperatures.

Still further, there is provided an Exhaust Gas Oxygen (EGO) sensor and preferably, but not necessarily, a Heated Exhaust Gas Oxygen (HEGO) sensor. Such sensors are operative to monitor engine exhaust gases and generate corresponding electrical signals when the air/fuel mixture of the fuel switches between rich and lean. The HEGO switch points are indicative of the air/fuel mixture as it passes through stoichiometry.

Finally, the system includes an Electronic Control Assembly (ECA) which is provided in electrical communication with the HEGO and the fuel injectors. The ECA includes a Keep Alive Memory (KAM) and monitors the HEGO during closed loop fuel control so as to receive the generated electrical signals. The ECA is further adapted to generate and store in the KAM an updatable extended adaptive fuel control table of air/fuel ratio multipliers for selected engine load/engine speed cells.

In a preferred embodiment, the ECA is adapted to update each of these cells in an amount proportional to the distance the corresponding load point is away from the corresponding load point of all bordering cells. The ECA may further be adapted to generate and store an updatable counter table and an updatable time stamping table. The counter table is operative to indicate how many times the speed/load points corresponding to each of the adaptive fuel table cells have been fully adapted. Similarly, the time stamping table is operative to indicate the time at which each of these cells was last fully adapted.

Finally, the ECA may be adapted to smear the average value of selected cells which, in accordance with the updatable counter table and the updatable time stamping table, are deemed "mature" so as to eliminate the need for each cell to learn starting from its present value. In accordance with the invention, smearing only occurs to a cell that is greater than a tolerance from a "learned" cell.

Armed with this information, the ECA correspondingly adjusts the fuel injectors to provide the correct adaption for the current fuel at the current engine speed and engine load.

Also in accordance with the above stated objects and other objects, features and advantages of the present invention, the method of the present invention is directed to adjusting fuel injectors of a motor vehicle in order to provide the correct stoichiometric A/F ratio for the current fuel/engine speed and engine load. Like the above system, the method is directed for use in a motor vehicle having a fuel tank, a fuel rail and an Electronic Control Assembly (ECA) which includes a Keep Alive Memory (KAM). The motor vehicle is similarly operative to run on a plurality of fuels and fuel blends.

Like the system disclosed above, the method also includes the steps of providing a fuel mixer, a stratification mixer and an Exhaust Gas Oxygen (EGO) sensor which is preferably, but not necessarily, a Heated Exhaust Gas Oxygen (HEGO) sensor. The fuel mixer is provided in fluid communication with the fuel tank to slow the rate at which the new fuel composition is blended with the existing fuel composition. The stratification mixer is similarly provided in fluid communication with the fuel rail to re-mix components of blended fuels that may have separated at cold temperatures.

Finally, the heated HEGO sensor is provided to monitor engine exhaust gases and generate corresponding electrical signals when the air/fuel mixture of the fuel switches between rich and lean.

Again, the switch points correspond to when the air/fuel mixture passes through stoichiometry. By monitoring the HEGO sensor during closed loop fuel control, adaptive error terms can be calculated. Once identified, an updatable adaptive fuel control table may be modified and stored in the KAM of the electronic control assembly. The adaptive fuel control table contains air/fuel ratio multipliers for selected engine load/engine speed cells. By correspondingly adjusting the fuel injectors in accordance with identified air/fuel ratio multipliers, the correct stoichiometric A/F ratio for the current fuel at the current engine speed and engine load is provided.

In a preferred embodiment, the motor vehicle is adapted to run on gasoline, alcohol and gasoline/alcohol blends between A0 and A100. The method further includes the steps of determining how many times the speed/load points corresponding to each of the above-referenced cells have been fully adapted and generating and storing in the ECA a corresponding updatable counter table. In this preferred embodiment, the method also includes the steps of determining the time at which each of the cells was last fully adapted and generating and storing in the ECA a corresponding updatable time stamping table. Each of the cells are updated in an amount proportional to the distance the corresponding speed load point is away from the corresponding speed load points of all bordering cells. Finally, in order to eliminate the need for each cell to learn starting from its present value, the method provides for determining in accordance with the updatable counter table and the updatable time stamping table, those cells which are "mature". Once determined, the adaptive fuel control table "smears" the average value of these identified mature cells onto all cells which are greater than a threshold away from the learned cells.

The above objects and other objects, features, and advantages of the present invention are readily apparent from the following detailed description of the best modes for carrying out the invention when taken in connection with the accompanying drawings wherein like reference numerals correspond to like components.

BEST MODES FOR CARRYING OUT THE INVENTION

Figure 1:
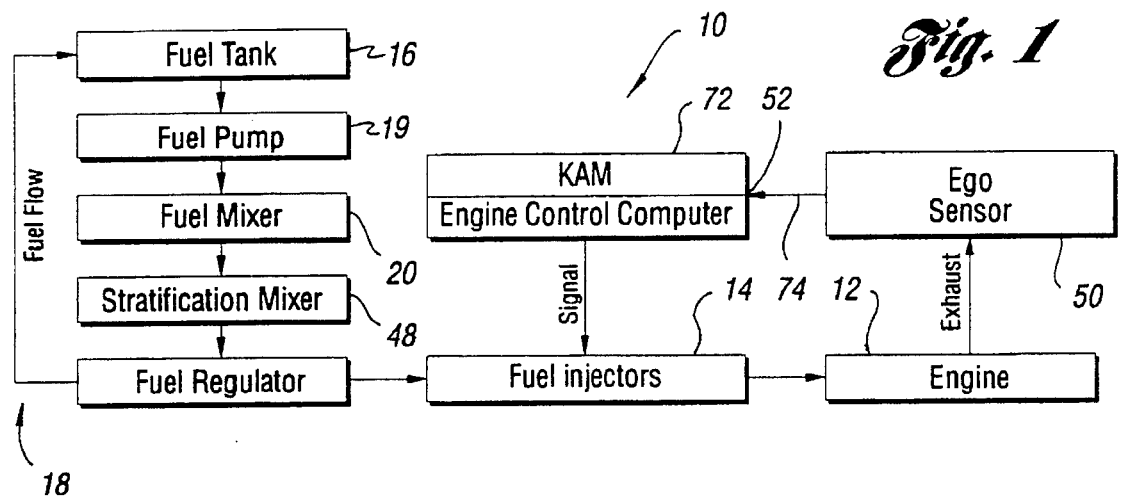
FIG. 1 is a block diagram of the system of the present invention.

Referring to FIG. 1, the system of the present invention is shown in a generalized block diagram identified by reference numeral 10. System 10 is adapted for use in a motor vehicle powered by an engine 12 having fuel injectors 14, a fuel tank 16, a fuel rail 18 and a fuel pump 19. The motor vehicle is operative to run on a plurality of fuels and fuel blends such as, for example, gasoline, alcohol and gasoline/alcohol blends between A0 and A100.

Adaptive fuel control system 10 further includes a passive fuel mixer 20 which is provided in fluid communication with fuel tank 16. Fuel mixer 20 has an entrapped volume of approximately 3 liters in the preferred embodiment. However, it may have a greater or lesser volume dependent on other characteristics of the system, i.e. fuel pump flow rate. In operation, fuel mixer 20 acts as a fluid damper to slow the rate at which new fuel composition is blended with existing fuel composition. As recognized by applicants, this alleviates the problem of having to accommodate a step change in fuel composition going to the engine should the driver elect to re-fuel with a fuel mixture containing a substantially different air/fuel (A/F) ratio than that presently in the vehicle fuel system. With the fuel mixer 20, the new fuel is blended at a rate proportional to the volume of the mixer used, and the flow rate generated by the fuel pump. However, the fuel mixture should be sized based on the desired rate of change of fuel composition, fuel flow and main fuel tank capacity.

Figure 2:
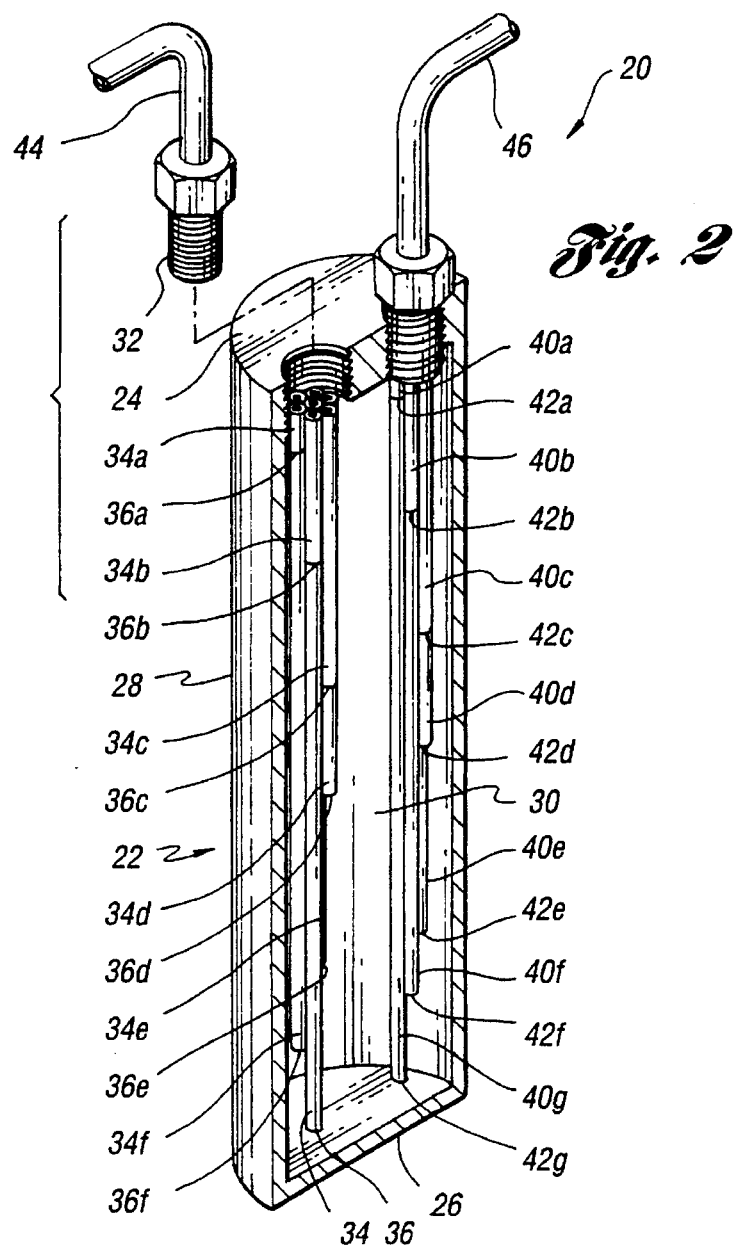
FIG. 2 is a schematic diagram of the fuel mixer adapted for use in the present invention.

A typical passive fuel mixer suitable for use with the present invention is shown in FIG. 2 in greater detail. Fuel mixer 20 includes reservoir 22 having a top 24, bottom 26, and side wall 28 to define an internal volume 30. Reservoir 22 is adapted to retain a predetermined quantity of fuel within its internal volume. This predetermined quantity, based upon the volumetric size of internal volume 30, is dependent upon the fuel flow rate and the desired maximum rate of change of fuel composition. As indicated above, the higher the desired reduction of the composition rate change (i.e., the slower the rate of composition change which is needed for a particular application), the larger the volumetric size of internal volume 30 is made. For example, it has been found that for a fuel system having a fuel pump capable of pumping fuel at 90 liters per hour, a reservoir having an internal volume sized to retain a quantity of 0.25 liters of fuel is sufficient for the stratification mixer (when coupled with sufficient mixing means, drawing means, and other features) to adequately reduce the rate of composition change of a fuel containing components commonly used in alternative fuel vehicles. Although shown as a cylinder, reservoir 22 can be formed in any desired shape and constructed from any rigid, fuel impervious material.

Reservoir 22 includes a threaded connector 32 for receiving fuel from fuel tank 16 when it is pumped from a fuel pump (not shown). Fuel mixer 20 further includes distribution tubes 34a–g having second ends 36a–g. Second end 36a terminates near the top 24 of reservoir 22 while second end 36g terminates near the bottom 26 of reservoir 22. Second ends 36b–f terminate at levels which fall in between those of 36a and 36g.

Fuel mixer 20 further includes take up tubes 40a–g having second ends 42a–g. Second end 42a terminates near the top 24 of reservoir 22 while second end 42g terminates near the bottom 26 of reservoir 22. Second ends 42b–f terminate at levels which fall in between those of 42a and 42g.

Fuel mixer 20 also includes an upstream fuel line 44 provided in fluid communication with fuel tank 16 and a downstream fuel line 46 provided in fluid communication with stratification mixer 48. More specific details regarding the structure and operation of this typical passive fuel mixing device may be found with reference to U.S. Pat. No. 5,277,166, issued to Freeland on Jan. 11, 1994 and assigned to Ford Motor Company.

Referring again to FIG. 1 of the drawings, stratification mixer 48, referenced above, is a conventional component and is provided in fluid communication with fuel mixer 20 to re-mix components of blended fuels that may have separated at cold temperatures. For example, if the motor vehicle to which system 10 is adapted for use with is operative to run on gasoline/alcohol blends, stratification mixer 48 will re-mix alcohol which may have separated from gasoline.

Referring still to FIG. 1 of the drawings, system 10 also utilizes a switching Exhaust Gas Oxygen (EGO) type sensor 50. This type of EGO sensor is already on almost all current production motor vehicles manufactured in North America. The purpose of the EGO sensor is to monitor the exhaust gases and signal to the Engine Control Assembly (ECA) 52 provided on system 10, which is also sometimes also called an engine control computer 52, when the air/fuel mixture has switched between rich to lean and vice versa. The resulting EGO switch point is an indication of an air/fuel mixture passing through stoichiometry.

Figure 3:
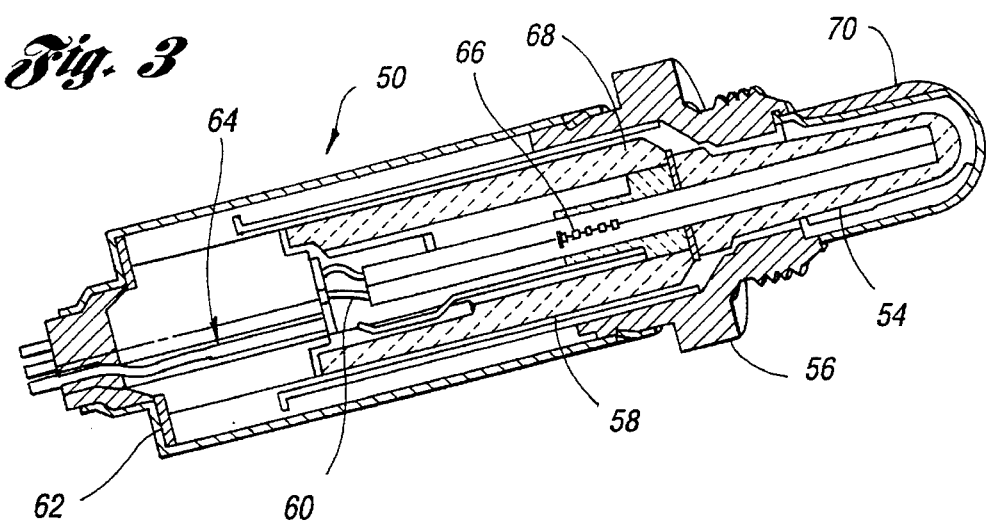
FIG. 3 is a cross-sectional view of an Exhaust Gas Oxygen (EGO) sensor adapted for use in the present invention.
Figure 4:
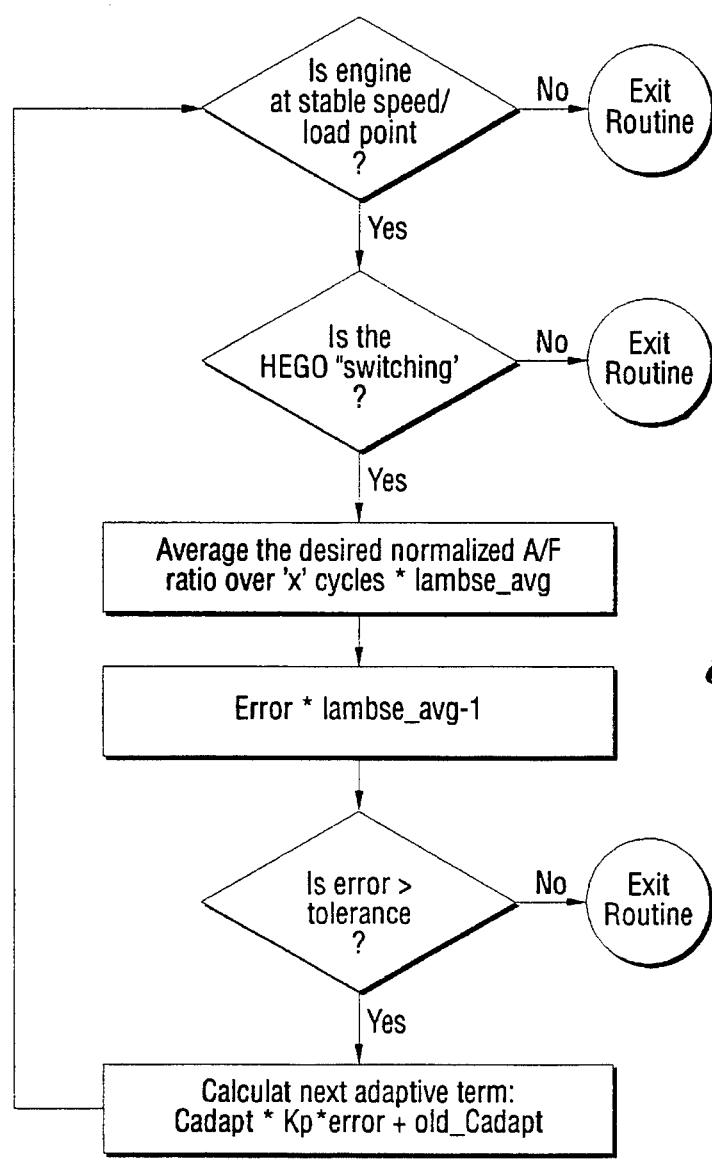
FIGS. 4–8 of the drawings are software flow charts illustrating the adaptive fuel control of the present invention.
Figure 5:
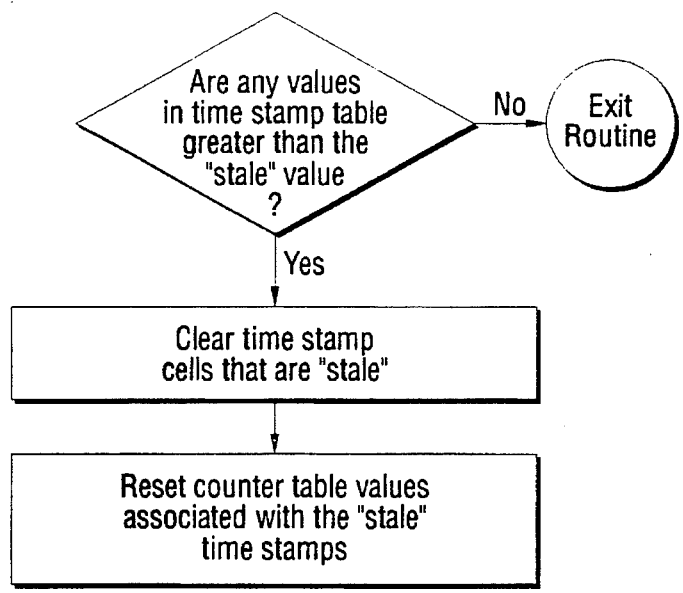
Figure 6:
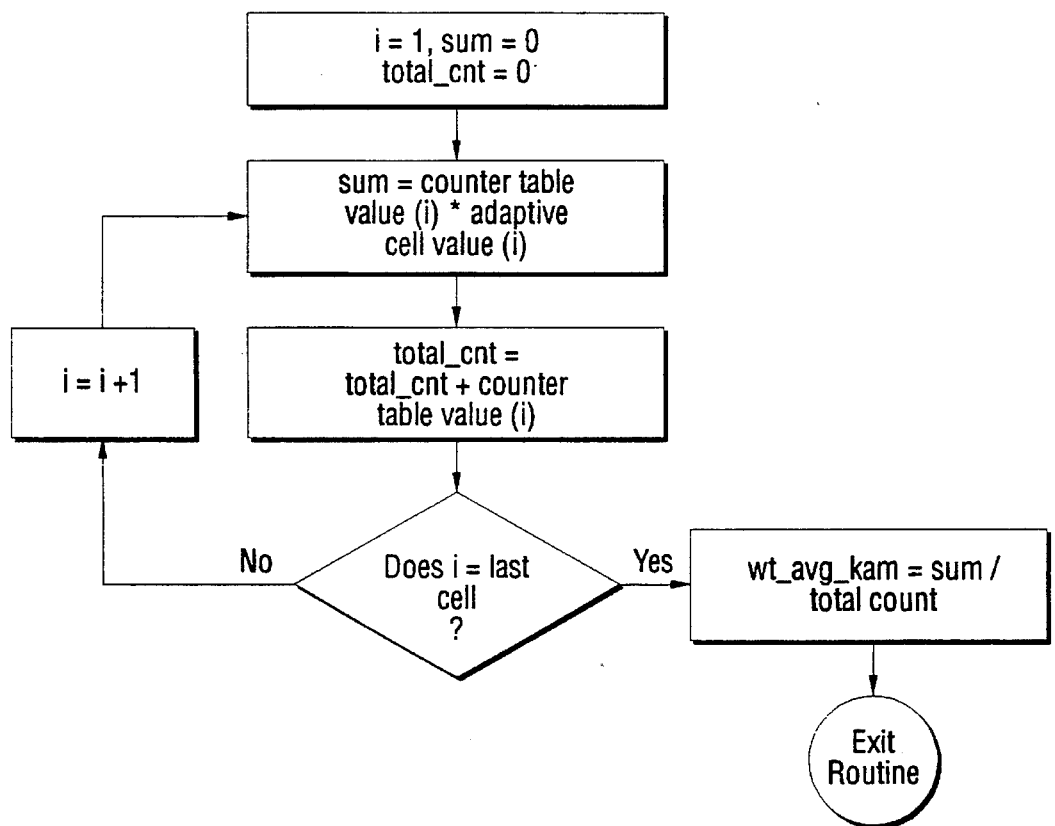
Figure 7:
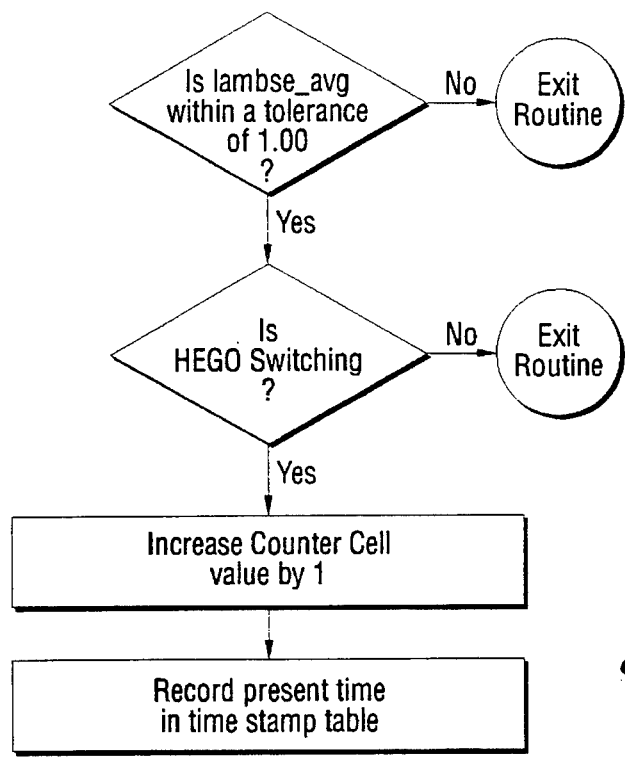
Figure 8:
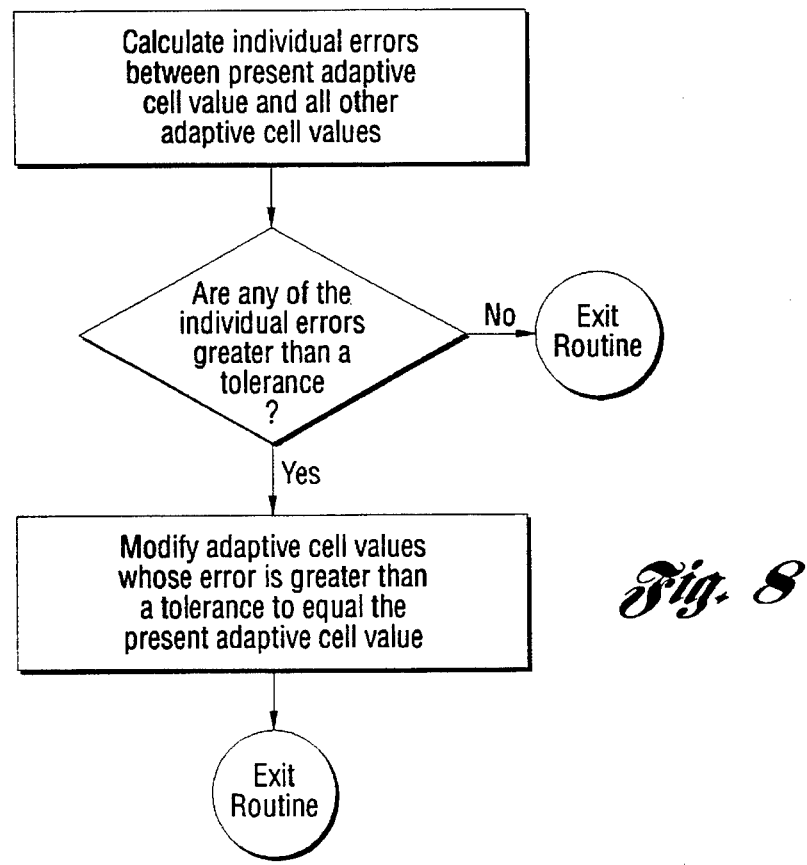

As shown in further detail in FIG. 3 of the drawings, EGO sensor 50 acts as a voltage source and series resistance. In operation, if the air/fuel ratio is lean, sensor 50 will output a low voltage (nominally 0–100 mV). In contrast, if the air/fuel ratio is rich, the sensor 50 will output a high voltage (nominally 700–1000 mV). EGO sensor 50 has a sensor element 54 which is typically a zirconium dioxide ceramic thimble with precious metal surface electrodes. The ceramic thimble is oxygen ion-conductive and generates a voltage signal as a result of the oxygen partial pressure difference between the exhaust gases on its outer surface and the ambient air on its inner surface.

As those skilled in the art will recognize, some EGO sensors have internal heaters. These sensors are called Heated Exhaust Gas Oxygen (HEGO) sensors. A HEGO sensor will obtain and stay at operating temperature faster than an EGO sensor and is therefore preferred, although not required, for use with the present invention.

Still referring to FIG. 3 of the drawings, the Exhaust Gas Oxygen sensor 50 may, for example, be of the disc spring type which includes a sensor housing 56, a supporting ceramic 58, connecting wires 60 and a disc spring 62. In the example shown, EGO sensor 50 further includes contact rivets 64, a PTC heating element 66, a clamping part 68 and a three slot protective tube 70, all of which are conventional components and known to those of skill in the art. Applicants recognize that any suitable EGO may be used in accordance with the invention. Thus, the example discussed is provided for illustrative purposes only and is not intended as a limitation.

Returning again to FIG. 1 of the drawings, and as indicated above, system 10 also includes Engine Control Assembly (ECA) 52, sometimes also generally referred to as engine control computer, which is provided in electrical communication with the EGO sensor 50 and fuel injectors 14 which may be CF or BFI as known to those skilled in the art. ECA 52 also includes a Keep Alive Memory (KAM) 72 which is adapted to monitor EGO sensor 50 during closed loop fuel control and to receive the electrical signals generated by EGO sensor 50. As explained in further detail herein, the ECA 52 is further adapted to generate and store in the KAM 72 an updatable adaptive fuel control table of air/fuel ratio multipliers for selected engine load/engine speed cells. Still further, ECA 52 is adapted to correspondingly adjust fuel injectors 14 so as to provide the correct stoichiometric A/F ratio for the current fuel, engine speed and engine load.

As understood by those skilled in the art, delivering the correct fuel and spark advance signals to an engine are the primary functions of an engine control system. "Correct" fueling may be stated as the exact mass of fuel delivered to each cylinder that can be fully combusted with the cylinder air charge such that no excess hydrocarbons or oxygen will be present after complete combustion. An air/fuel mixture may be said to be at "stoichiometry" when this optimum air mass ratio to fuel mass has been achieved. The goal of virtually all fueling strategies is to control the engine about stoichiometry for as much of the time as possible.

The switching-type Exhaust Gas Oxygen sensor (EGO or HEGO for a heated device) is the only feed-back sensor used for production fuel control. This sensor has a "switch point" where voltage output switches between a nominal value and zero volts as the actual exhaust gas presented to it goes through stoichiometry. HEGO voltage is high when exhaust presented is richer than stoichiometry, low when the mixture is lean. Effectively, only two states can be detected from the HEGO sensor: rich or lean exhaust gas conditions.

Conventional fuel strategies either increase or decrease actual fuel requests based on the state of the HEGO sensor. (Differences arise in the shape of control waveforms.) This type of control produces an oscillation about stoichiometry. Fuel control signals are generally posed in the dimension of normalized air/fuel ratio described as follows:

$$\lambda = \frac{(Air_{actual}/Fuel_{actual})}{(Air/Fuel)_{const}} \quad (1)$$

As shown in the above equation identified by reference numeral (1), $\lambda$ (lambda) is the air and fuel present normalized by the theoretical air/fuel ratio of stoichiometry for a particular fuel. The stoichiometric air/fuel ratio of gasoline is 14.56, 9.0 for ethanol. When "$\lambda$" equals 1, the mixture is at stoichiometry.

The variable "$\lambda$" indicates an actual or measured value, the variable "lambse" designates a "desired" mixture value. (Both are in the dimension of normalized air/fuel ratio.) The fuel control signal is also referred to as "lambse". The concept of actual versus desired values is at the core of understanding adaptive fuel control.

In accordance with the present invention, the theoretical equation for "lambda" is used as the basis for the desired "lambse" equation. The difference between the two is a factor that has been included in the "lambse" equation (2), below, that captures inaccuracies of a real system. This is the adaptive term. System inaccuracies result from: error and mass error sensor output, increased resistance from air filter, clogging of fuel injectors, decrease of fuel pump pressure, etc.

$$Lambse = \frac{(Air_{act}/Fuel_{act})}{(Air/Fuel)_{const}} * C_{adaptive} \quad (2)$$

In keeping with the invention, when the system has successfully adapted, then a desired average "lambse" value equaling 1 should produce an actual normalized air/fuel ratio value that equals 1. If desired and actual values do not agree, then adaption of the system needs to take place.

Consider, for example, the information available and calculated in a production vehicle. Equation (2), above, is used to calculate the next fuel value delivered to an engine. Actual air is measured with either a mass air flow sensor, or inferred from a manifold pressure sensor. The fuel constant for stoichiometric control is hard coded into the strategy. Again, if this value does not match that of the present fuel, the adaptive term compensates for the resulting system inaccuracy. Lambse, as previously stated, is the desired fueling for a particular instant in time. Rearranging equation (2) to solve for fuel value, yields the following equation (3). (It should be noted that for exemplary purposes only, units of fuel are not considered, nor are any transient adder terms.)

$$fuel = \frac{1}{lambse} * \frac{(Air_{act})}{(Air/Fuel)_{const}} * C_{adaptive} \quad (3)$$

Against this background, the question which may be addressed is: how is actual "lambda" determined in a production vehicle? Again, the error between actual and desired normalized air/fuel is used to adjust the adaptive term. The only feedback sensor to indicate actual air/fuel ratio is the HEGO. To make matters more difficult, the HEGO only indicates qualitative information: whether the system is running rich or lean. A heuristic is thus used to determine when the average actual air/fuel ratio value is at lambda=1: if the HEGO is switching due to the input fueling oscillation. By definition, the HEGO will switch at actual=1. While some error may be associated with this approach as the actual average lambda may be slightly off, especially if the strategy ramps rich further than it ramps lean in its oscillations (or vice versa), this error is nominal at best. Indeed, this heuristic allows the most information to be gained from scant system data.

Figure 9:
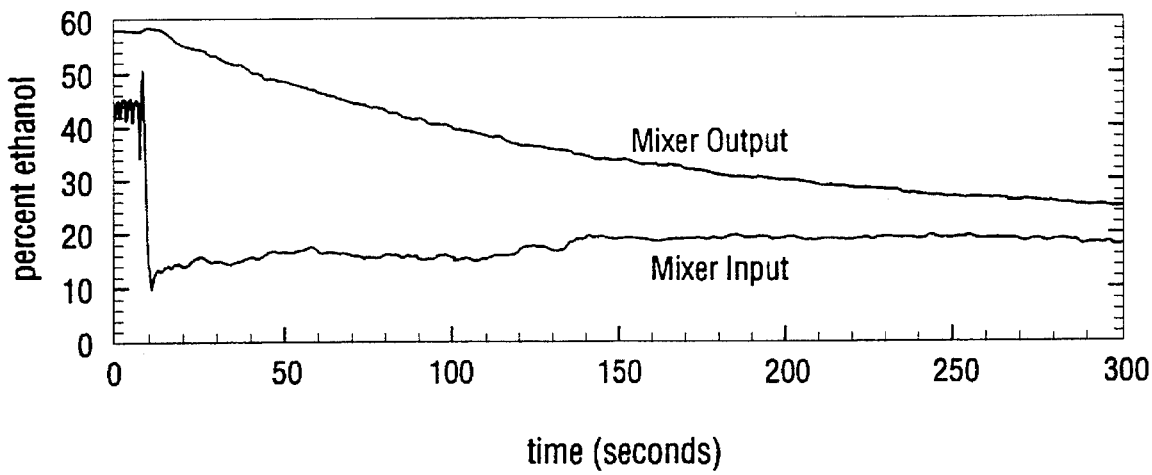
FIG. 9 is a graph of refueling mixer input/output during refueling.

With applicants' best estimate of when "actual" lambda equals 1 defined, further discussion is warranted of "desired" lambse waveform. Desired lambse is slightly misleading in the fact that the true desired value is 1 for stoichiometric control. If the system were absolutely perfect, then lambse would equal 1 all the time. However, since the system is not perfect, lambse does not always equal 1 and feed-back is still required. In the present invention, information from the HEGO sensor is thus the only feed-back value used for fueling control. In conventional engine control systems, the only real "desire" that can be implemented is to increase or decrease from the present fuel value. Thus, regardless of the present value of lambse, the HEGO information "overrides" the fuel control strategy. For example, if "desired" lambse equals a seemingly rich value of 0.95, but the HEGO is still indicating lean, then the fuel control strategy would continue to increase fueling by making lambse even richer, for example, to 0.94. In this scenario, the average lambse value with the HEGO switching could be 0.93. This is the exact scenario in which adaption will take place. Actual lambda is estimated at 1, since the HEGO is switching. The difference between desired and actual is 1−0.93=0.7. Thus, adaption is merely changing the constant term applied to the fuel calculation. How this term is changed, once a difference between actual lambda and desired lambse has been detected is dependent on the particular adaptive strategy used. Software flow charts which schematically describe the above adaptive fuel strategy in accordance with the present invention are shown in FIGS. 4–8 of the drawings. A schematic graph illustrating refueling mixer input/output during refueling is also shown in FIG. 9.

As reflected above, adaptive fuel strategies are normally used to adjust for slight variability between engines, aging, or deterioration of engine components or parts over time. Adaptive strategies are normally calibrated to adjust for small changes over a long period of time. Fuel adaptive adjustment is done via a table of air/fuel ratio multipliers such as that shown in FIG. 10 and are stored in Keep Alive Memory (KAM) 72 in the Engine Control Assembly 52. The table is organized as a function of engine speed and engine loading. Engine load is measured either by intake Manifold Air Pressure (MAP) for speed density systems, or by intake air flow, for Mass Air Flow (MAF) systems.

Normally, with a perfect engine and software perfectly calibrated for that engine, the table cell values all remain at 1.0. Thus, no adjustments for air/fuel ratios are necessary. However, as those skilled in the art will recognize, over time, with partially clogged fuel injectors, dirty air filters, etc., the table cell values are adjusted to accommodate these adverse conditions. In operation, the EGO sensor 50 continually senses whether the fuel exhaust is either rich (excessive fuel) or lean (not enough fuel) and generates an electrical signal 74 for receipt by the Engine Control Assembly 52. The engine control software identifies this condition, adjusts the desired A/F ratio variable which, in turn, adjusts the fuel pulsewidth. A heuristic approach is used to determine the actual air/fuel ratio: "When the HEGO is switching due to the input fueling oscillation than actual A/F ratio equals 1." When a significant difference between average desired A/F ratio and the heuristically determined actual A/F ratio is detected, then adaption takes place. The corresponding air/fuel ratio multiplier is adjusted by an amount proportional to the difference between actual and desired A/F ratios.

Figure 10:
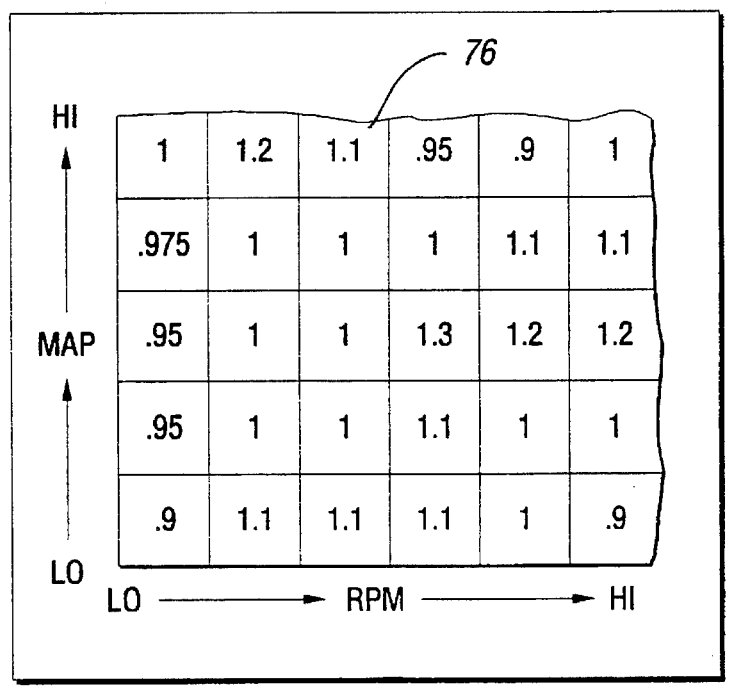
FIG. 10 is a schematic diagram of the adaptive fuel control table of the present invention.

Presently, there is a table of air/fuel ratio multipliers as shown in FIG. 10, referred to as an adaptive fuel control table 76, which is utilized for adaptive fuel control in the present invention. Applicants note that a single fuel multiplier could be used to adjust for adaptive learning. However, it was known that the amount of adjustment required to fuel varied primarily as a function of engine speed and engine load. Thus, even with a partially clogged fuel injector, the amount of adjustment over different speed and loads was found to be different, and a single fuel correction multiplier was deemed insufficient.

OPERATION

By utilizing the EGO sensor 50 as an indication of stoichiometry, the system and method of the present invention may be used to determine correct air/fuel mixture for a given fuel and system and may further be adjusted through the adaptive fuel table 76 of the type shown in FIG. 10. It should be understood that the EGO sensor 50 switches at stoichiometry. From this switching, it can therefore be determined what fuel to deliver for this operating point to keep the engine at stoichiometry.

Significantly, the system and method of the present invention is not able to determine if the correction to the fuel is due to changes in the composition of fuel or changes due to other system conditions such as a dirty air filter or clogged fuel injectors. As it turns out, however, it does not matter, since the objective of the present invention is to deliver correct fuel for the air entering the engine regardless of the cause. Indeed, the system and method of the present invention allows for the handling of any rapid changes in engine conditions that affect the air/fuel ratio and not just changes in fuel composition.

As referenced above, Electronic Control Assembly 52 is operative to generate and store in KAM 72 updatable adaptive fuel control table 76 of air/fuel ratio multipliers. As known to those skilled in the art, the air/fuel ratio for gasoline is 14.56 and 9.0 for ethanol and 6.45 for methanol. However, should one or a new blend of two or more of these fuels be combined into a fuel system that had been adjusted for one of these fuels or a different blend of one or more of these fuels, the A/F mixture would no longer be at stoichiometry and problems with exhaust emissions and driveability would be noticed. The use of the adaptive fuel control table 76 and other information permits the EGO sensor 50 to learn the new fuel being introduced. For the present system, however, the adaptive fuel software had to be modified to adjust the fuel multiplier more quickly to adjust for the influx of new fuel being introduced into the fuel system.

A proportional term was therefore included in the adaptive routine which allows for greater cell adjustments when the error signal is large. When the adaptive values are very far off, this proportional term can quickly bring the value back to the correct fuel multiplier.

Significantly, the present invention does not operate on an exact speed load point in the table 76. Thus, a determination of which cell or cells to apply the adjustment calculated from the adaptive routine needs to be made. In operation, a portion of the adjustment amount is applied to all bordering cells. The portion of adjustment applied to each cell is determined proportionally by the "distance" the real speed/load value is to that cell. Consider, for example, a two dimensional explanation wherein the actual speed is 2200 rpm and cells exist for 2000 rpm and 2500 rpm. Also assume that the adjustment amount was calculated by the EGO sensor 50 to be positive 10. In accordance with the proportional term of the present invention, $\frac{2}{5}$ of 10 is added to the 2000 rpm cell and $\frac{3}{5}$ of 10 is added to the 2500 rpm cell. This proportionality allows for faster adaptation than prior art fuel control tables.

Once in closed loop fuel control, the system of the present invention is operative to read the EGO sensor 50 and then adjust fuel pulsewidth for the rich or lean condition. Consider, for example, when alcohol is introduced in gasoline. In such a case, the air/fuel stoichiometric point begins to shift away from 14.6 for gasoline, to 9.0 for ethanol or to 6.45 for methanol. By utilizing an aggressive adaptive strategy, applicants have found that the disclosed system can quickly adjust for the change in fuel composition of the fuel mixture. Of course, the worst case condition is when the main fuel tank has run completely empty of gasoline and then is fully refueled with alcohol. The fuel mixture becomes of greatest importance as it is needed to slow the rate of change of the new fuel until the EGO sensor 50 is operable (hot), allowing it to enter closed loop. The fuel mixer 20 dampens the rate of change of fuel such that the adaptive strategy can learn the new incoming fuel once in closed loop control.

One problem encountered by applicants early in the development of the present invention was that only a few cells could be adapted and adjusted in the adaptive table 76 after refueling. Since the adaptive table 76 is a function of engine speed and engine load, not all speed/load points in the table were being learned. The result was that some cells for speed/load points were fully learned and corrected while others reflected very old information and were no longer relevant to air/fuel ratios for the fuel present in the tank. As those skilled in the art will recognize, this becomes a particular problem when the driver changes to a different speed/load operating point after the new fuel has had a chance to recirculate in the fuel system. The driver would be transitioning from one learned speed/load cell to an unlearned one. Since the driver would be going from a corrected air/fuel to one that is perhaps extremely lean, a very noticeable stumble, engine misfire, or hesitation would likely occur.

To alleviate this problem, applicants devised, as part of the present system and method, a means for allowing all table cells to utilize the information regarding the new fuel from the learned cells. This technique is generally referred to as "smearing".

Once a cell or group of adaptive cells have learned, the average value of those cells is used and applied. This allows for updates of all unlearned adaptive cells using the values from recently learned cells. Smearing eliminates the need for each and every cell to learn starting from its present value. A cell update will thus occur only if that cell is more than a calibratable tolerance band away from the cell(s) that have just been learned. Smearing provides a quick method to update the entire table. This also alleviates the driveability problems encountered when transitioning from one learned speed/load point to an unlearned one.

Because there is insufficient time to learn an entire adaptive table during a re-fueling introduction, applicants found it necessary to further devise a method to use those operating points the engine was at during closed loop that have learned (adapted to) the new fuel. Simply put, applicants devised a mechanism to log which cells were learning, at, and how much learning was done at those cells. This information is used in accordance with the present invention for the next open loop start-up.

An important modification made of the strategy is the "time stamping" of each adaptive cell update. Time stamping is necessary to determine how old each cell in the adaptive table is. Since the fuel introduction is happening quickly, only the most recent cells that are learned for this fuel may be used for determining changing fuel composition. For smearing, any adaptive information more than a few minutes old may have been learned under a previous fuel mixture. That information is therefore no longer valid and must be disregarded when using the adaptive table information for learning the most recent fuel composition.

Figure 11:
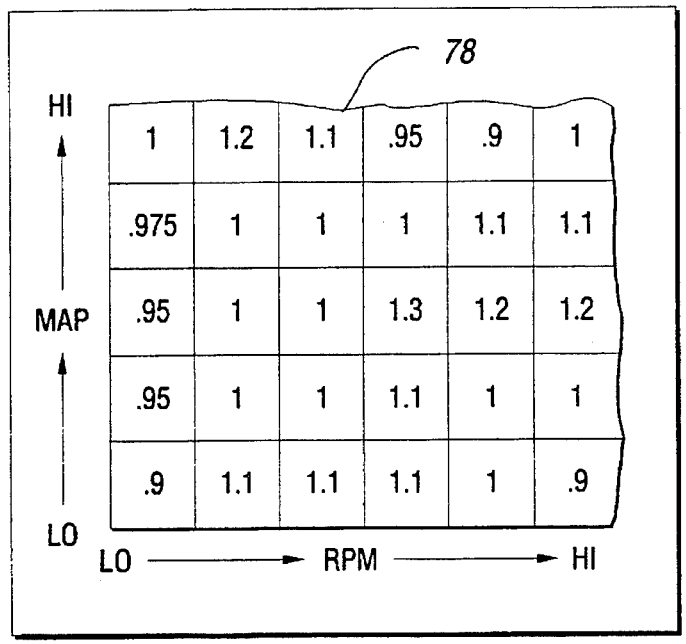
FIG. 11 is a schematic diagram of the updatable time stamping table of the present invention.

The time stamp table 78 of the present invention which is shown in FIG. 11 of the drawings, is used in the open loop fuel start-up strategy as well as closed loop operation. Whereas the adaptive cell entries are ignored if the last cell information is greater than a specified period of time, for example, four hours. Applicants found that this cell information may be too old to rely on for determining the proper air/fuel ratio for the next open loop start-up. The time stamp cell is a snap-shot of the clock that indicates the last time the adaptive cell was fully adapted. For a 10×10 adaptive table such as that shown in FIG. 10, for example, there is a direct corresponding 10×10 updatable time stamp table as shown in FIG. 11.

Figure 12:
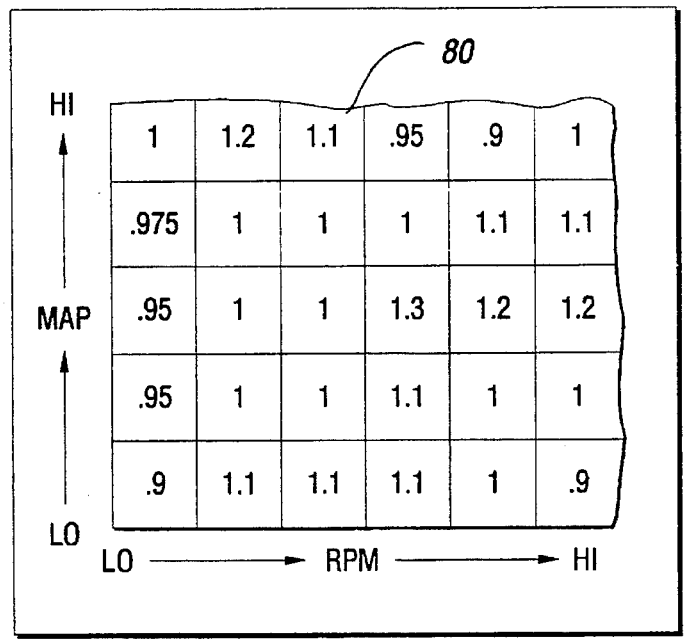
FIG. 12 is a schematic diagram of the updatable counter table of the present invention.

Also in accordance with the present invention, there is provided a mechanism to determine how mature an adaptive cell is. Applicants accomplished this by creating a counter table 80 which provides a method in which to point to those adaptive cells that have just recently fully adapted for the new fuel. The counter table 80, as shown in FIG. 12 of the drawings, represents a count of how often the system is fully adapted for every speed/load point. Like the time stamp table, for each and every adaptive cell there is a corresponding counter cell.

Significantly, the counter table 80 does not indicate how many times a cell has been updated. Rather, it indicates how many times that speed/load point has been fully adapted. (The speed/load cell will no longer update, but the time stamp cell and the counter cell will). The counter table is only used during the next open loop start-up fuel calculations. It is not used in the smearing operations described above.

Also in accordance with the present invention, adaptive table maturity has been defined based on the number of times a speed/load cell has been fully adapted. The counter table 80, as described above, provides this indication. The strategy will take a "weighted average" of the adaptive cells that were pointed to by the counter table 80 and uses that value for the air/fuel ratio multiplier of the next open loop start-up.

In keeping with the invention, Applicants found that there are times when the entire Engine Control Assembly 52 cannot use information from the EGO sensor 50 and therefore must operate in open loop fuel. The situations that prohibit entry and operation in closed loop fuel are many and are known to those skilled in the art. The EGO sensor 50 for instance, must be hot before it can be used in start-up. The engine strategy must wait typically between 40 seconds and 2 minutes before the EGO sensor 50 is heated before operating in closed loop. During this time, the system cannot learn any information regarding the fuel mixture and must rely on information learned from the previous closed loop run.

In accordance with the present invention, at start-up, when the system is operating at open loop fuel, the best information from the adaptive table 76 must therefore be used regarding the air/fuel content of the present fuel. The most mature information as referenced above is therefore available regarding the fuel composition from the adaptive fuel table 76 and is utilized accordingly.

Figure 13:
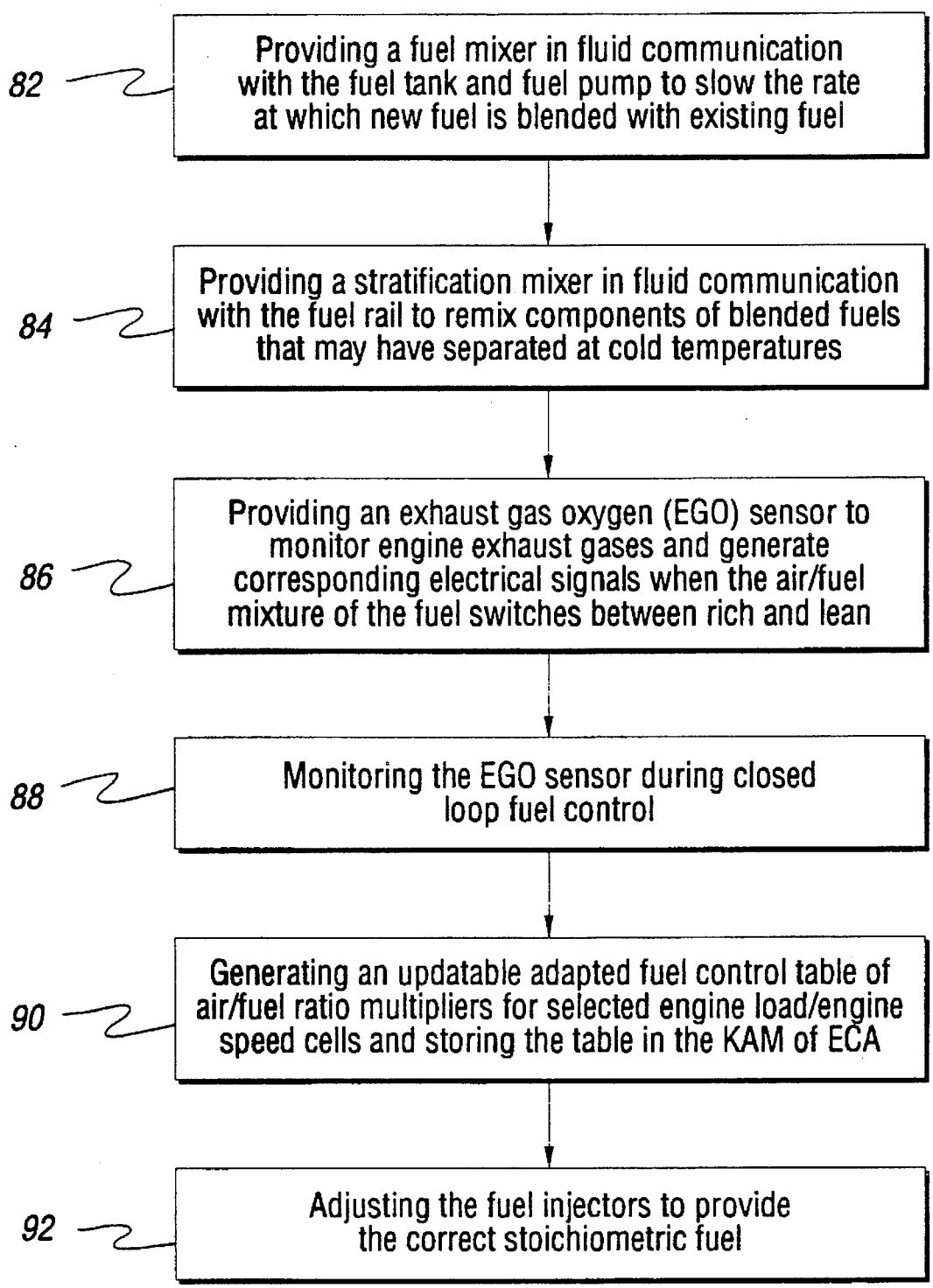
FIG. 13 is a block diagram of the method steps of the present invention.

Referring now to FIG. 13 of the drawings, the method steps of the present invention are identified in further detail. As reference above, the method is adapted for use in a motor vehicle powered by a fuel-injected engine and having a fuel tank, a fuel rail and an Electronic Control Assembly which further includes a Keep Alive Memory (KAM). The motor vehicle is operative to run on a plurality of fuels and fuel blends.

As shown in FIG. 13, the method includes the steps of providing 82 a fuel mixer in fluid communication with the fuel pump and fuel tank to slow the rate at which new fuel is blended with existing fuel. The method further includes providing 84 a stratification mixer in fluid communication with the fuel rail to re-mix components of blended fuels that may have separated at cold temperatures. Still further, an Exhaust Gas Oxygen (EGO) sensor is provided 86 to monitor engine exhaust gases and generate corresponding electrical signals when the air/fuel mixture of the fuel switches between rich and lean. As referenced above, these switch points correspond to when the air/fuel mixture passes through stoichiometry. By monitoring 88 the EGO sensor during closed loop fuel control, the EGO switch points may be identified. An updatable adaptive fuel control table of air/fuel ratio multipliers for selected engine load/engine speed cells may thereafter be generated 90 and stored in the KAM of the ECA. Thereafter, the fuel injectors may be correspondingly adjusted 92 to provide the correct stoichiometric A/F ratio.

While the best modes for carrying out the invention has been described in detail, those familiar with the art to which this invention relates will recognize various alternative designs and embodiments for practicing the invention as defined by the following claims.

What is claimed is:

1. For use in a motor vehicle powered by a fuel-injected engine, said motor vehicle having a fuel tank, a fuel pump and a fuel rail and operative to run on a plurality of fuels and fuel blends, an adaptive fuel control system comprising:

a fuel mixer provided in fluid communication with said fuel tank and said fuel pump, said fuel mixer operative as a fluid damper to slow the rate at which new fuel is blended with existing fuel;

a stratification mixer provided in fluid communication with said fuel rail, said stratification mixer operative to re-mix components of blended fuels that may have separated at cold temperatures;

an Exhaust Gas Oxygen Sensor (EGO) operative to monitor engine exhaust gases and generate corresponding electrical signals when the air/fuel mixture of said fuel switches between rich and lean, said EGO switch points indicative of the air/fuel mixture passing through stoichiometry; and an Electronic Control Assembly (ECA) provided in electrical communication with said EGO and said fuel injectors, said ECA having a Keep Alive Memory (KAM) and adapted to monitor said EGO during closed loop fuel control and receive said electrical signals, said ECA further adapted to generate and store in said KAM an updatable adaptive fuel control table of air/fuel ratio multipliers for selected engine load/engine speed cells and correspondingly adjust said fuel injectors to provide the correct fuel request for the current fuel, engine speed, and engine load.

2. The system of claim 1 wherein said motor vehicle is adapted to run on gasoline, alcohol and gasoline/alcohol blends between A0 and A100.

3. The system of claim 1 wherein said stratification mixer is operative to re-mix alcohol with gasoline which may have separated due to the effects of temperature or moisture content.

4. The system of claim 1 wherein said ECA is further adapted to generate and store an updatable counter table indicating how many times the speed/load points corresponding to each of said cells have been fully adapted.

5. The system of claim 4 wherein said ECA is further adapted to generate and store an updatable time stamping table indicating the time at which each of said cells was last fully adapted.

6. The system of claim 4 wherein said ECA is further adapted to smear throughout said adaptive fuel control table the average value of selected cells which, in accordance with said updatable counter table and said updatable time stamping table are deemed mature so as to eliminate the need for each cell to learn starting from its present value.

7. The system of claim 1 wherein said ECA is further adapted to update each of said cells in an amount proportional to the distance the corresponding speed load point is away from the corresponding speed load points of all bordering cells.

8. For use in a motor vehicle powered by a fuel-injected engine, said motor vehicle having a fuel tank, a fuel pump, a fuel rail, and an Electronic Control Assembly (ECA) having a Keep Alive Memory (KAM), said motor vehicle further operative to run on a plurality of fuels and fuel blends, a method of adjusting said fuel injectors to provide the correct fuel request for the current fuel, engine speed and engine load, comprising:

providing a fuel mixer in fluid communication with said fuel tank to slow the rate at which new fuel is blended with existing fuel;

providing a stratification mixer in fluid communication with said fuel rail to re-mix components of blended fuels that may have separated at cold temperatures;

providing an Gas Oxygen Sensor (EGO) to monitor engine exhaust gases and generate corresponding electrical signals when the air/fuel (A/F) mixture of said fuel switches between rich and lean, said EGO switch points corresponding to when said air/fuel mixture passes through stoichiometry;

monitoring said EGO sensor during closed loop fuel control to identify said EGO switch points;

generating and storing in said KAM an updatable adaptive fuel control table of air/fuel ratio multipliers for selected engine load/engine speed cells; and correspondingly adjusting said fuel injectors to provide a correct stoichiometric A/F ratio.

9. The method of claim 8 wherein said motor vehicle is adapted to run on gasoline, alcohol, and gasoline/alcohol blends between A0 and A100.

10. The method of claim 8 further comprising:

determining how many times the speed/load points corresponding to each of said cells has been fully adapted; and generating and storing in said ECA a corresponding updatable counter table.

11. The system of claim 10 further comprising:

determining the time at which each of said cells was last fully adapted; and generating and storing in said ECA a corresponding updatable time stamping table.

12. The method of claim 11 further comprising:

determining in accordance with said updatable counter table and said updatable time stamping table those cells which are mature; and smearing throughout said adaptive fuel control table the average value of selected mature cells so as to eliminate the need for each cell to learn starting from its present value.

13. The method of claim 8 further comprising updating each of said cells in an amount proportional to the distance the corresponding speed load point is away from the corresponding speed load points of all bordering cells.

14. The method of claim 8 further comprising utilizing said adaptive fuel control, updatable counter and updatable time stamping tables to provide operable stoichiometric A/F ratio at engine startup before closed loop fuel control is attained.

* * * * *